US009277156B2

(12) United States Patent
Bennett et al.

(10) Patent No.: US 9,277,156 B2
(45) Date of Patent: Mar. 1, 2016

(54) UNIVERSAL PARALLEL TELEVISION REMOTE CONTROL

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1510 days.

(21) Appl. No.: 11/290,079

(22) Filed: Nov. 30, 2005

(65) Prior Publication Data

US 2007/0124772 A1   May 31, 2007

(51) Int. Cl.
| | |
|---|---|
| H04N 5/44 | (2011.01) |
| G11B 19/02 | (2006.01) |
| H04N 21/462 | (2011.01) |
| H04N 21/482 | (2011.01) |
| H04N 21/41 | (2011.01) |
| H04N 21/422 | (2011.01) |
| H04N 21/426 | (2011.01) |
| H04N 21/436 | (2011.01) |
| H04N 21/485 | (2011.01) |
| G11B 15/02 | (2006.01) |
| G11B 31/00 | (2006.01) |

(52) U.S. Cl.
CPC ............ *H04N 5/4403* (2013.01); *G11B 19/027* (2013.01); *H04N 21/4108* (2013.01); *H04N 21/42209* (2013.01); *H04N 21/42226* (2013.01); *H04N 21/42684* (2013.01); *H04N 21/43615* (2013.01); *H04N 21/4622* (2013.01); *H04N 21/482* (2013.01); *H04N 21/485* (2013.01); *G11B 15/023* (2013.01); *G11B 31/00* (2013.01); *H04N 21/42224* (2013.01); *H04N 2005/441* (2013.01); *H04N 2005/4435* (2013.01)

(58) Field of Classification Search
CPC .................................................... H04N 5/4403
USPC ..................................... 340/15; 725/111–114
See application file for complete search history.

(56) References Cited

U.S. PATENT DOCUMENTS

| | | | | |
|---|---|---|---|---|
| 5,410,326 | A  * | 4/1995 | Goldstein ...................... | 348/734 |
| 5,861,881 | A  * | 1/1999 | Freeman et al. .............. | 715/201 |
| 6,344,817 | B1 * | 2/2002 | Verzulli ........................ | 341/176 |
| 6,407,779 | B1 * | 6/2002 | Herz .............................. | 348/734 |
| 6,781,518 | B1 * | 8/2004 | Hayes et al. ............. | 340/825.72 |
| 6,859,197 | B2 * | 2/2005 | Klein et al. ................... | 345/158 |
| 6,970,127 | B2 * | 11/2005 | Rakib ........................... | 341/173 |
| 7,050,907 | B1 * | 5/2006 | Janky et al. .................. | 701/213 |
| 2001/0030597 | A1* | 10/2001 | Inoue et al. .................. | 340/3.7 |
| 2001/0033243 | A1* | 10/2001 | Harris et al. ................. | 341/176 |
| 2002/0019984 | A1* | 2/2002 | Rakib ........................... | 725/111 |

(Continued)

*Primary Examiner* — Claire X Pappas
*Assistant Examiner* — Robert Stone
(74) *Attorney, Agent, or Firm* — Brinks Gilson & Lione

(57) ABSTRACT

A portable control unit that interacts with a variety of types of media equipment. The control unit searches for media equipment (including media players) located within an area and retrieves user interaction information corresponding to discovered media players. The control unit can be instructed to control any of the discovered media players. The control unit uses the retrieved user interaction information to adapt. The control unit may periodically, or when relocated, look for new media players in its neighborhood. The control unit interacts with multiple multimedia sources that supply video and/or audio to the media players. The control unit may have a screen on which it displays a video in addition to controlling selection and presentation of a video and/or an audio in any one of the discovered media players. The control unit maintains an updateable media guide that provides a list of multimedia elements available for viewing and/or listening.

17 Claims, 9 Drawing Sheets

(56) References Cited

U.S. PATENT DOCUMENTS

| | | | |
|---|---|---|---|
| 2002/0069276 A1* | 6/2002 | Hino et al. .................... 709/223 |
| 2002/0173339 A1* | 11/2002 | Safadi .......................... 455/553 |
| 2003/0038849 A1* | 2/2003 | Craven et al. ................. 345/864 |
| 2003/0103088 A1* | 6/2003 | Dresti ................... G06F 3/0481 |
| | | | 715/835 |
| 2003/0136827 A1* | 7/2003 | Kaneko et al. ................ 235/375 |
| 2003/0151538 A1* | 8/2003 | Escobosa et al. ............. 341/176 |
| 2003/0229900 A1* | 12/2003 | Reisman ........... G06F 17/30873 |
| | | | 725/87 |
| 2004/0003051 A1* | 1/2004 | Krzyzanowski et al. ..... 709/217 |
| 2004/0004630 A1* | 1/2004 | Kalva et al. ................... 345/702 |
| 2004/0162626 A1* | 8/2004 | Farchmin et al. ............... 700/96 |
| 2004/0186595 A1* | 9/2004 | Baud et al. ....................... 700/17 |
| 2005/0094610 A1* | 5/2005 | de Clerq et al. ............... 370/338 |
| 2005/0096753 A1* | 5/2005 | Arling et al. .................... 700/11 |
| 2005/0172321 A1* | 8/2005 | Kakuda ........................... 725/81 |
| 2005/0188267 A1* | 8/2005 | Farchmin .......... G05B 19/4184 |
| | | | 714/35 |
| 2005/0251827 A1* | 11/2005 | Ellis .................. H04N 5/44543 |
| | | | 725/47 |
| 2006/0125968 A1* | 6/2006 | Yokozawa et al. ............. 348/734 |
| 2007/0210918 A1* | 9/2007 | Haines ...................... G01S 5/12 |
| | | | 340/539.32 |
| 2008/0278635 A1* | 11/2008 | Hardacker ......... H04N 5/44582 |
| | | | 348/734 |

* cited by examiner

UNIVERSAL PARALLEL TELEVISION REMOTE CONTROL

CROSS-REFERENCE TO RELATED APPLICATIONS/INCORPORATION BY REFERENCE

The present application is related to U.S. patent application Ser. No. 11/290,974, filed Nov. 30, 2005, titled "PARALLEL TELEVISION REMOTE CONTROL," U.S. patent application Ser. No. 11/290,297, filed Nov. 30, 2005, titled "CONTROL DEVICE WITH LANGUAGE SELECTIVITY," U.S. patent application Ser. No. 11/289,971, filed Nov. 30, 2005, titled "PHONE BASED TELEVISION REMOTE CONTROL," and U.S. patent application Ser. No. 11/289,848, filed Nov. 30, 2005, titled "PARALLEL TELEVISION DOCKING ADAPTER," each of which is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

Various aspects of present invention relate to remote control devices used with a variety of home entertainment equipment and more particularly, with a plurality of types of media equipment produced by a corresponding plurality of manufacturers.

2. Description of the Related Art

In home entertainment systems, remote controls are commonly used to support user interaction with a piece of media equipment from a distance. Supporting such interaction, remote controls are typically hand held, portable devices configured with multiple predefined buttons. Typical functions performed by such predefined buttons include controlling television channel selection, audio and video settings, media storage and playback, and media equipment power. Specifically, the remote control responds to a user's button selection by wirelessly sending a corresponding control signal to a piece of media equipment using infrared or RF transmission. The receiving media equipment responds to the control signal by implementing the requested changes.

Televisions receive channels from service providers, either directly or indirectly, via cable, fiber and satellite set top box. In addition to televisions and set top boxes, many other types of media equipment are used to provide supplemental or alternate audio and video to televisions or other media equipment. Some types directly source locally accessed media, and others alternatively or in addition include television broadcast tuners for managing television channel selection and video and audio settings. Exemplary types of media equipment include DVD (Digital Video Disk) players, audio systems, PVR (Personal Video Recorder) systems, game consoles, camcorders, digital cameras, etc. Each of these media systems is controlled through direct interaction or via one or more remote controls.

Each home entertainment system installation usually comprises more than one piece of media equipment. For example, a home entertainment system might comprise two televisions, two set top boxes, a DVD player, an audio system and a PVR system. Each piece of media equipment usually has a separate dedicated remote control that has a plurality of pseudo-unique buttons and button layout. Understanding buttons of each dedicated remote control is difficult, tedious and often a practically impossible task.

Some remote controls exist that attempt to control multiple pieces of media equipment. These "non-dedicated" or "universal" remote controls employ various techniques to carry out such control. Some universal remotes are constructed to work with multiple types of media equipment produced by a single manufacturer. As long as the home entertainment system comprises media equipment of that manufacturer, the universal remote control work will prove adequate. However, if a different manufacturer's media equipment is added, the universal remote will not suffice.

Other universal remote controls exist that attempt to support media equipment of multiple manufacturers. One type of such universal remotes requires the user to reference a catalog of manufacturer's media equipment to identify a programming code that is entered into the universal remote to cause it to adapt to support such equipment. When further media equipment is added to the home entertainment system or a battery change-out is required, the user must re-reference the catalog to reprogram the universal remote. If the media equipment is not identified in the catalog or the catalog is lost, the universal remote will not provide adequate support and additional remote control units are needed. Also, because latest media equipment releases typically occur after the catalog and universal remote control are created, both the catalog and the universal remote control often fail to support future media equipment additions and modifications.

Another type of universal remote exists that attempts to overcome such problems by "learning" their operation from dedicated remote controls. For example, the user is required to aim the dedicated remote control at the universal remote control and press each button on the dedicated remote control followed by pressing a corresponding button on the universal remote such that the universal remote learns the wireless signaling to deliver with a user's future universal remote control button presses. This training process is very time consuming, has to be repeated for each piece of media equipment in the home installation, and may have to be repeated if battery power is lost. Also, if buttons exist on the dedicated remote control that are not on the universal, they may not be supported.

Further limitations and disadvantages of conventional and traditional approaches will become apparent to one of ordinary skill in the art through comparison of such systems with various aspects of the present invention.

BRIEF SUMMARY OF THE INVENTION

A remote control that interacts with a variety of types of entertainment equipment and controls settings and display of videos on screens of the entertainment equipment, substantially as shown in and/or described in connection with at least one of the figures, as set forth more completely in the claims. These and other advantages, aspects and novel features of the

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
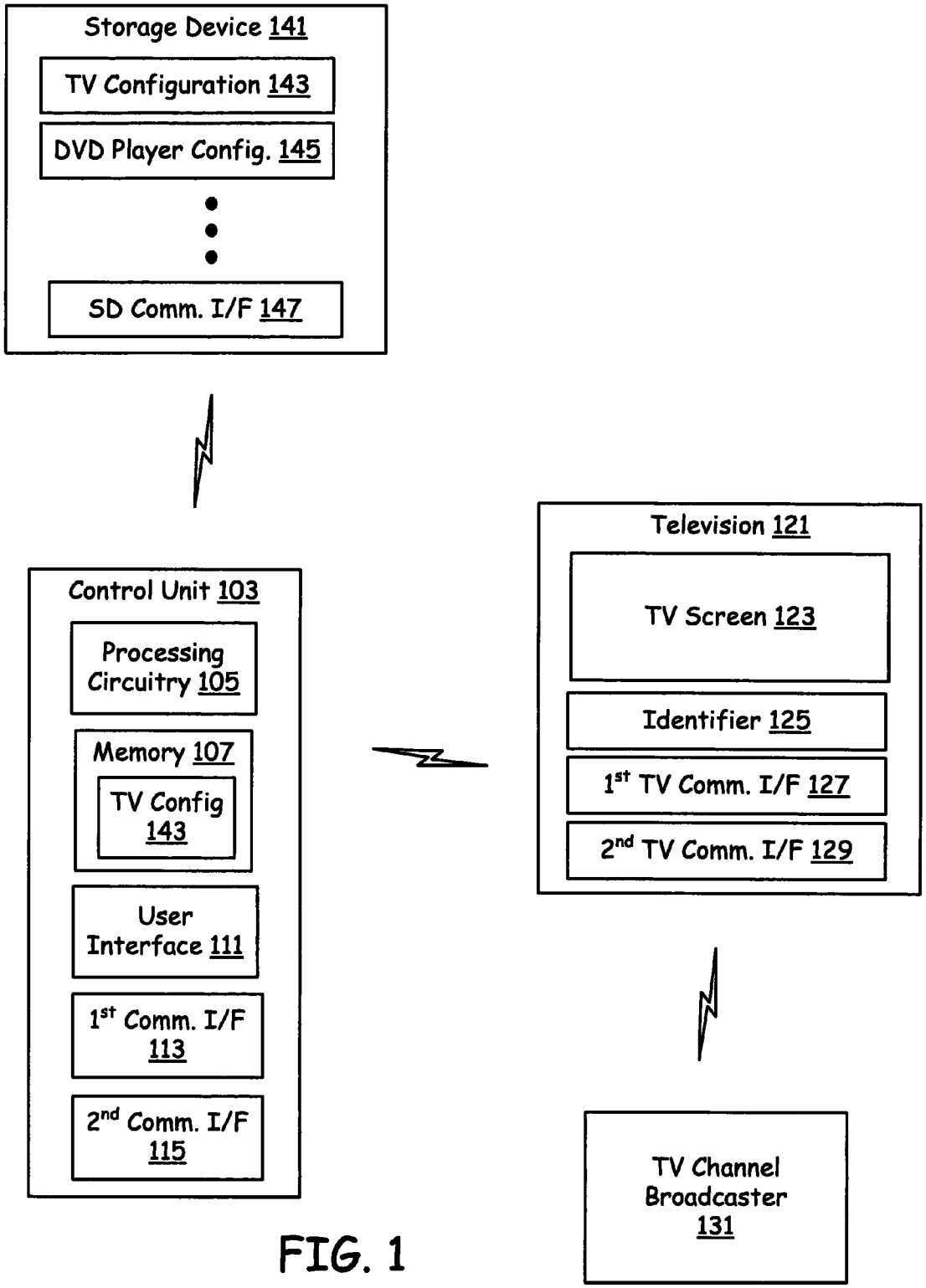
FIG. 1 is a schematic block diagram illustrating interaction between a control unit, a television, a television channel broadcaster and a storage device, the control unit adapts itself to control display on a screen of the television in accordance with various aspects of the present invention.

FIG. 1 is a schematic block diagram illustrating interaction between a control unit 103, a television 121, a television channel broadcaster 131 and a storage device 141, the control unit 103 adapts itself to control display on a screen 123 of the television 121 in accordance with various aspects of the present invention. The control unit 103 comprises processing circuitry 105, a memory 107, a user interface 111, a first communication interface 113 and a second communication interface 115. The control unit 103 interacts with the storage device 141 via the second communication interface 115. The television 121 comprises the screen 123, an identifier 125, a first TV communication interface 127 and a second TV (television) communication interface 129. The television 121 communicates with the television channel broadcaster 131 via the second TV communication interface 129. The storage device 141 comprises at least a TV configuration 143, a DVD player configuration 145 and a storage device communication interface (referred henceforth as SD communication interface) 147. The storage device 141 responds to the control unit 103 via the SD communication interface 147.

The identifier 125 corresponding to the television 121 may be, for example, one or a combination of a model number of the television 121 and a product registration number of the television 121. The control unit 103 receives the identifier 125 corresponding to the television 121 via the user interface 111. A user inputs the identifier 125 into the control unit 103 using the user interface 111 of the control unit 103. The processing circuitry 105 of the control unit 103 determines that the TV configuration 143 corresponds to the identifier 125 using the identifier 125 and tries to access the TV configuration 143. The control unit 103 interacts with the storage device 141 via the second communication interface 115 and requests the storage device 141 for the TV configuration 143. The control unit 103 subsequently receives the TV configuration 143 from the storage device 141 via the second communication interface 115. The control unit 103 is shown in the FIG. 1 to be communicatively coupled to the storage device 141 via a first wireless link. The first wireless link may comprise characteristics of any of a variety of wireless link types, for example, Bluetooth, IEEE 802.11, IEEE 802.15, UltraWideBand, any of a variety of cellular link types, any of a variety of infrared or other optical link types, standard or propriety link types, etc.

In one embodiment, the control unit 103 may be communicatively coupled to some more storage devices other than the storage device 141. In the one embodiment, the control unit 103 learns, using the identifier 125, that the TV configuration 143 is stored in the storage device 141. Subsequently the control unit 103 accesses the storage device 141 to retrieve the TV configuration 143. The control unit 103 interacts with the television 121 via the first communication interface 113 and the television 121 responds to the control unit 103 via the first TV communication interface 127. A physical link may exist between the control unit 103 and the television 121. The control unit 103 and the television 121 may agree to communicate over the physical link after the control unit 103 receives the TV configuration 143. In another embodiment, the control unit 103 receives a user input via the user interface 111. The user input comprises an address of the storage device 141. The control unit 103 reaches the storage device 141 using the address and retrieves the TV configuration 143 from the storage device 141.

In yet another embodiment, the control unit 103 receives the identifier 125 corresponding to the television 121 from the television 121 through the first communication interface 113. In the yet another embodiment, the control unit 103 may be aware of and/or may learn that the TV configuration 143 corresponding to the identifier 125 is available with the storage device 141. The control unit 103 receives the TV configuration 143 from the storage device 141 via the second communication interface 115. The control unit 103 is shown in the FIG. 1 to be communicatively coupled to the television 121 via a second wireless link. The second wireless link may comprise characteristics of any of a variety of wireless link types, for example, Bluetooth, IEEE 802.11, IEEE 802.15, UltraWideBand, any of a variety of cellular link types, any of a variety of infrared or other optical link types, standard or propriety link types, etc. In some other embodiments, the communication link between the control unit 103 and the television 121 may comprise characteristics of a wired link, a tethered optical link etc.

The control unit 103 stores the TV configuration 143 in the memory 107 after receiving the TV configuration 143 from the storage device 141. The control unit 103 configures itself based on the TV configuration 143 to control settings of the television 121 and to control display on the screen 123 of the television 121. The control unit 103 may receive a channel selection via the user interface 111. The channel selection identifies a television channel from a plurality of television channels broadcast by the television channel broadcaster 131. The control unit 103 subsequently sends a control signal to the television 121 via the first communication interface 113 directing the television 121 to receive the television channel from the television channel broadcaster 131 and display the received television channel on the TV screen 123. The television 121 receives the control signal from the control unit 103 via the first TV communication interface 127. The television 121 is connected to the television channel broadcaster 131 over a communication link. The communication link is, for example, one or a combination of an infrared link, a satellite link, a microwave link, an optical link, a cellular network link, an Intranet link, an Internet link, etc. Next, the television 121 receives the television channel from the television channel broadcaster 131 via the second TV communication interface 129 and displays the received television channel on the screen 123. The control unit 103 may in addition or alternately receive a setting selection via the user interface 111. Subsequently, the control unit 103 directs the television 121 to implement setting changes corresponding to the setting selection. The setting selection may be, for example and without limitation, a power control command, an increase in brightness of the TV screen 123, a decrease in volume of a speaker of the television 121 etc.

Figure 2:
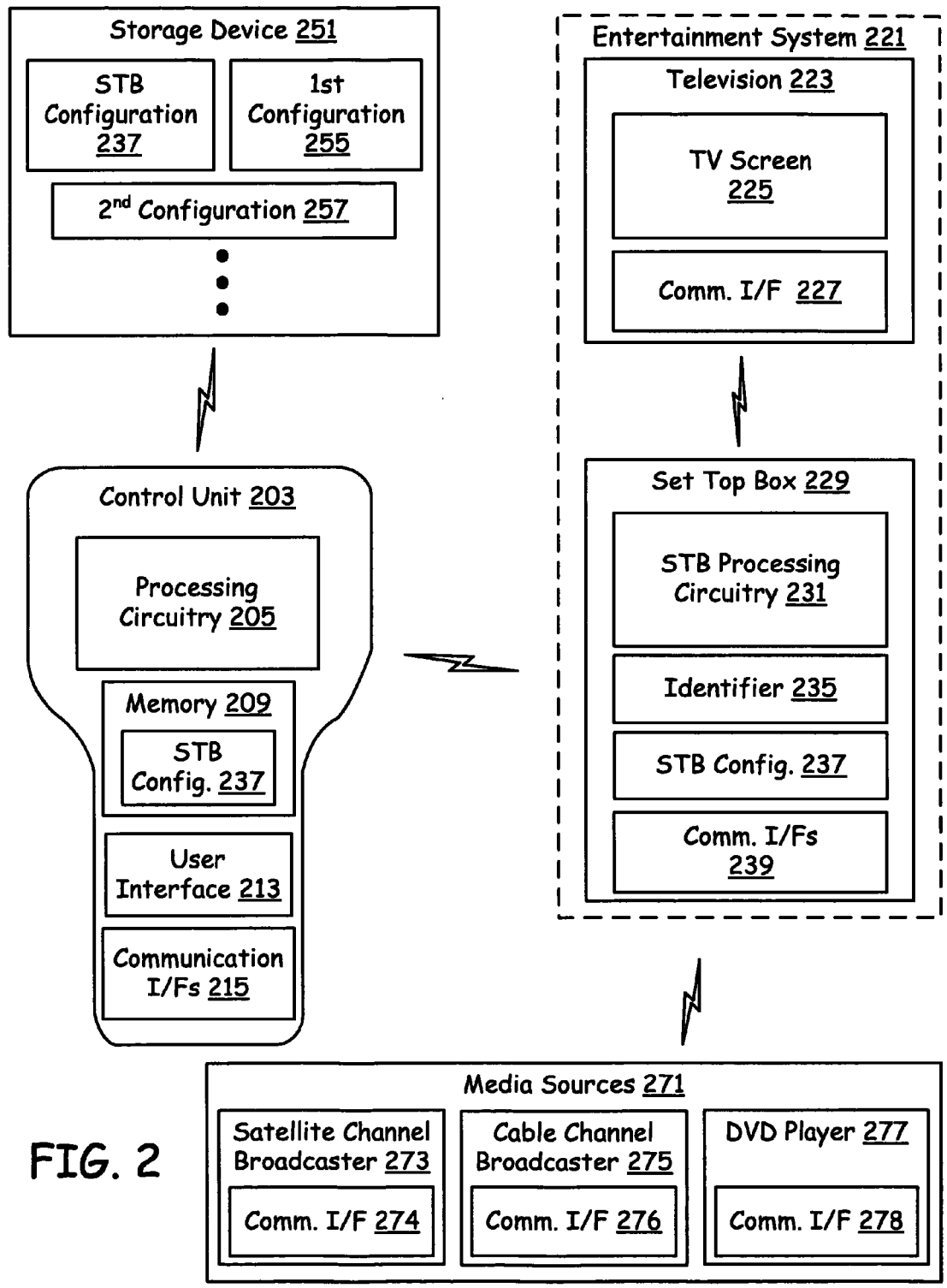
FIG. 2 is a schematic block diagram illustrating an embodiment of the control unit of FIG. 1 wherein the control unit controls display on the screen of the television via a set top box.

FIG. 2 is a schematic block diagram illustrating an embodiment of the control unit 103 of FIG. 1 wherein the control unit 203 controls display on the screen 225 of the television 223 via a set top box 229. The control unit 203 comprises processing circuitry 205, a memory 209, a user interface 213 and communication interfaces 215. The control unit 203 is communicatively coupled to the set top box 229 and the storage device 251 via the communication interfaces 215. The set top box 229 is a part of an entertainment system 221. The entertainment system 221 comprises the television 223 and the set top box 229. The set top box 229 may be a Cable TV set top box, a satellite TV set top box, a PVR (Personal Video Recording) system set top box, etc. The control unit 203 interacts with the entertainment system 221 via the set top box 229. The television 223 comprises a TV screen 225 and a communication interface 227 via which the television 223 communicates with the set top box 229. The set top box 229 comprises STB (set top box) processing circuitry 231, an identifier 235, a STB (set top box) configuration 237 and communication interfaces 239. Media sources 271 comprise a satellite channel broadcaster 273, a cable TV broadcaster 275 and a DVD (Digital Video Disk) player 277. The set top box 229 interacts with one of the media sources 271 or all of the media sources 271 but one at a time. The satellite channel broadcaster 273 comprises communication interface 274 via which it communicates with the set top box 229. The cable channel broadcaster 275 comprises a communication interface 276 via which it communicates with the set top box 229. The DVD player 277 interacts with the set top box 229 through communication interface 278.

The set top box 229 and the television 223 interact with each other over one or more of an infrared link, a radio frequency link, a Bluetooth link, a wireless LAN (local area network), a phone network, an optical fiber or any tethered wire via the communication interface 227. The set top box 229 receives a multimedia element (e.g., a movie, a television program, etc.) from the media sources 271 and forwards the multimedia element to the television 223 for display on the TV screen 225. The set top box may be adapted to control settings of the television 223. The set top box 229 may have a second user interface that may be used to select the multimedia element. The television 223 may in addition have a third user interface that may be used to select the multimedia element and control settings of the television 223. The television 223 interacts with the media sources 271 via the set top box 229.

The control unit 203 receives a user input via the user interface 213. The user input comprises the identifier 235. The identifier 235 may, for example, be a model number corresponding to the set top box 229. The processing circuitry 205 of the control unit 203 determines the identity of the manufacturer of the set top box 229 using the model number. The storage device 251 stores configurations of equipments (e.g., electronic devices) manufactured by the manufacturer. For example, the storage device 251 stores at least the STB configuration 237, a first configuration 255 and a second configuration 257. An address of the storage device 251 is stored in the memory 209 of the control unit 203. The control unit 203 is aware that the storage device 251 stores configurations of equipments manufactured by the manufacturer. The control unit 203, after determining identity of the manufacturer of the set top box 229, contacts the storage device 251 using the address. The storage device 251 may comprise a lookup table that is a mapping between an identifier and a corresponding configuration. The processing circuitry 205 of the control unit 203 reads the lookup table and determines that the STB configuration 237 corresponds to the identifier 235. Next, the control unit 203 requests the STB configuration 237 and subsequently receives the STB configuration 237 from the storage device 251 via the communication interfaces 215. The control unit 203 is connected to the storage device 251 via one or more of a tethered or non-tethered connection. In one embodiment, the control unit 203, after determining identity of the manufacturer of the set top box 229, establishes a communication link between the control unit 203 and the storage device 251 using the address and contacts the storage device 251 over the communication link using an agreed upon protocol. In some embodiments, the control unit 203 does not have the address of the storage device 251 stored in the memory 209. In such cases, the user input received by the control unit 203 may comprise the address of the storage device 251. The processing circuitry 205 of the control unit 203 resolves the address, and the control unit 203 communicates with the storage device 251 using the communication interfaces 215. Next the control unit 203 receives the STB configuration 237 from the storage device 251.

In another configuration, the control unit 203 receives the identifier 235 from the set top box 229. The above action may be preceded by a request from the control unit 203 to the set top box 229 for the identifier 235. The control unit 203 stores the received STB configuration 237 in the memory 209. In yet another configuration, the control unit 203 receives the STB configuration 237 from the set top box 229. In the yet another configuration the control unit 203 might not interact with the storage device 251.

The processing circuitry 205 of the control unit 203 configures the control unit 203 using the received STB configuration 237. The STB configuration 237 may comprise a plurality of functionalities performed by the set top box 229.

Configuring may include mapping the plurality of functionalities to the user interface 213 of the control unit 203. For example and without limitation, the user interface 213 comprises a plurality of buttons. The processing circuitry 205 assigns each of the plurality of functionalities to a corresponding one of the plurality of buttons. The user interface 213 of the control unit 203 is now used to control the plurality of functionalities performed by the set top box 229. The plurality of functionalities, for example and without limitation, comprises a 'power off' functionality, a 'screen brightness increase' functionality and 'channel up' functionality. The processing circuitry 205 assigns the 'power off' functionality to a first button from the plurality of buttons, the 'screen brightness increase' functionality to a second button from the plurality of buttons and the 'channel up' functionality to a third button from the plurality of buttons. If the first button of the user interface 213 is selected, then the control unit 203 sends a first control signal to the set top box 229 directing the set top box 229 to stop functioning. If the second button of the user interface 213 is selected, then the control unit 203 sends a second control signal to the set top box 229 directing the set top box 229 to actuate an increase in brightness of the TV screen 225. If the third button of the user interface 213 is selected, then the control unit 203 sends a third control signal to the set top box 229 directing the set top box 229 to receive a next television program (channel) from the media sources 271. Each of the media sources 271 comprises a plurality of programs, also called channels, which are numbered.

Once the control unit 203 is adapted to control the set top box 229, the user interface 213 of the control unit 203 receives a selection identifying a multimedia element available with one of the media sources 271 to be displayed on the TV screen 225. The control unit 203 directs the set top box 229 to receive the multimedia element from the one of the media sources 271. The set top box 229 receives the multimedia element from the one of the media sources 271 and forwards the multimedia element to the television 223 for display on the TV screen 225. For example and without limitation, the set top box 229 is a Cable TV set top box. The multimedia element identified by the selection is a television program broadcast by the cable channel broadcaster 275. The set top box 229 receives the television program (the multimedia element) from the cable channel broadcaster 275 (the one of the media sources 271) and forwards the television program to the television screen 225. For example and without limitation, the multimedia element may comprise characteristics of a movie, a music video, a television program, a television channel, a sporting or other entertainment event, a news report, a computer game or any of a variety of recorded or live multimedia information.

Figure 3:
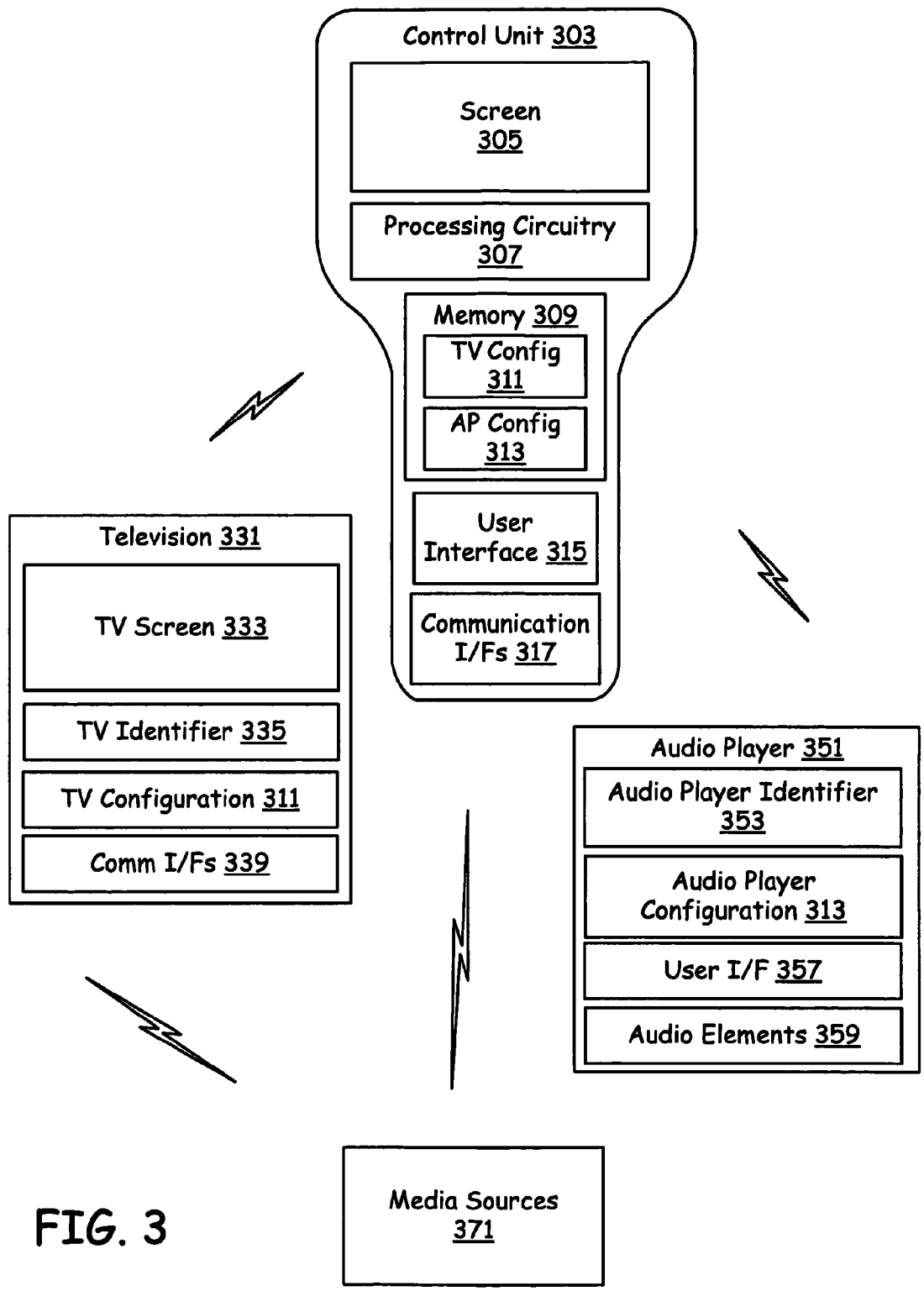
FIG. 3 is a schematic block diagram illustrating an embodiment of the control unit of FIG. 1 wherein the control unit further comprises a screen and adapts itself to control settings of an audio player.

FIG. 3 is a schematic block diagram illustrating an embodiment of the control unit 103 of FIG. 1 wherein the control unit 303 further comprises a screen 305 and adapts itself to control settings of an audio player 351. The control unit 303 comprises a screen 305, processing circuitry 307, a memory 309, a user interface 315 and communication interfaces 317. The control unit 303 receives a first user input via the user interface 315. The first user input triggers the control unit 303 to acquire a television configuration 311. The control unit 303 acquires the television configuration 311 via a communication link between the control unit 303 and the television 331. The communication link may exist between the control unit 303 and the television 331 and/or may be established by the control unit 303 after receiving the first user input. The control unit 303 stores the television configuration 311 in the memory 309. The processing circuitry 307 of the control unit 303 configures the control unit 303 to control the television 331 using the television configuration 311. For example and without limitation, the user interface 315 of the control unit 303 comprises a plurality of buttons, and the television configuration 311 comprises a button layout image. The control unit 303 displays the button layout image on the screen 305. The button layout image on display reveals a mapping between each of the plurality of buttons and a corresponding functionality performed by the television 331. The processing circuitry 307 of the control unit 303 configures the control unit 303 such that each of the plurality of buttons actuates the corresponding functionality in the television 331 on selection. A typical functionality may be a 'power off' functionality, a 'screen brightness increase' functionality, a 'next program' functionality, etc. The button layout image educates a user to use the control unit 303 for controlling the television 331. The mapping may comprise a correspondence between some of the plurality of buttons and a functionality, which some of the plurality of buttons actuate on selection.

The control unit 303 receives a second user input via the user interface 315. The second user input identifies a first television program to be displayed on television screen 333 and a second television program to be displayed on the screen 305 of the control unit 303. The control unit 303 sends a signal to television 331 directing the television 331 to display the first television program on the television screen 333. The television retrieves the first television program from media sources 371 and displays the first television program on the television screen 333. The control unit 303 communicates with the media sources 371 and retrieves the second television program from the media sources 371. The control unit 303 displays the second television program on the screen 305.

The control unit 303 receives a third user input via the user interface 315. The third user input triggers the control unit 303 to retrieve an audio player configuration 313 from the audio player 351. The control unit 303 sets up a communication link with the audio player 351. The communication link may be, for example, a wireless link. In some configurations, a physical wired link might already exist between the control unit 303 and the audio player 351. The setting up of the communication link may include an exchange of addresses between the control unit 303 and the audio player 351 and an agreement of communication protocol between the control unit 303 and the audio player 351. The control unit 303 receives the audio player configuration 313 from the audio player 351 via the communication link and stores the audio player configuration 313 in the memory 309. The audio player configuration 313 may comprise a second button layout image that reveals correspondence between buttons (the user interface 315) of the control unit 303 and a plurality of functionalities the buttons will actuate in the audio player 351 on selection. The control unit 303 displays the second button layout image on the screen 305. The control unit 303 configures itself using the audio player configuration 313. The control unit 303 is now ready to be used to control the audio player 351. A user, who interacts with the control unit 303 visually, makes a selection using the second button layout image and inputs the selection via the buttons (the user interface 315) of the control unit 303. The control unit 303 receives a fourth user input that identifies an audio element to be played on the audio player 351. The control unit 303 sends a second signal to the audio player 351 directing the audio player 351 to retrieve the audio element from the media sources 371. The audio player 351 receives the audio element from the media sources 371 and plays the audio element in the audio player 351.

The control unit 303 is located at a first premises, the television 331 is located at a second premises, the audio player 351 at a third premises and the media sources 371 at a fourth premises. In some embodiments the television 331 and the audio player 351 are located at the second premises. In one embodiment, after receiving the first user input the control unit 303 searches for the television configuration 311 and the audio player configuration 313 in the memory 309. If not found, then the control unit 303 tries to retrieve the television configuration 311 and the audio player configuration 313 from the television 331 and the audio player 351 respectively. The control unit 303 adapts itself to be used as a remote controlling device for the television 331 or as a remote controlling device for the audio player 351 as per input received via the user interface 315 of the control unit 303. In one embodiment, the control unit 303 does not store the television configuration 311 and the audio player configuration 313 in the memory 309. The control unit 303 receives a configuration (the television configuration/the audio player configuration) as per the input and configures itself for remotely controlling corresponding media equipment (the television/the audio player).

Figure 4:
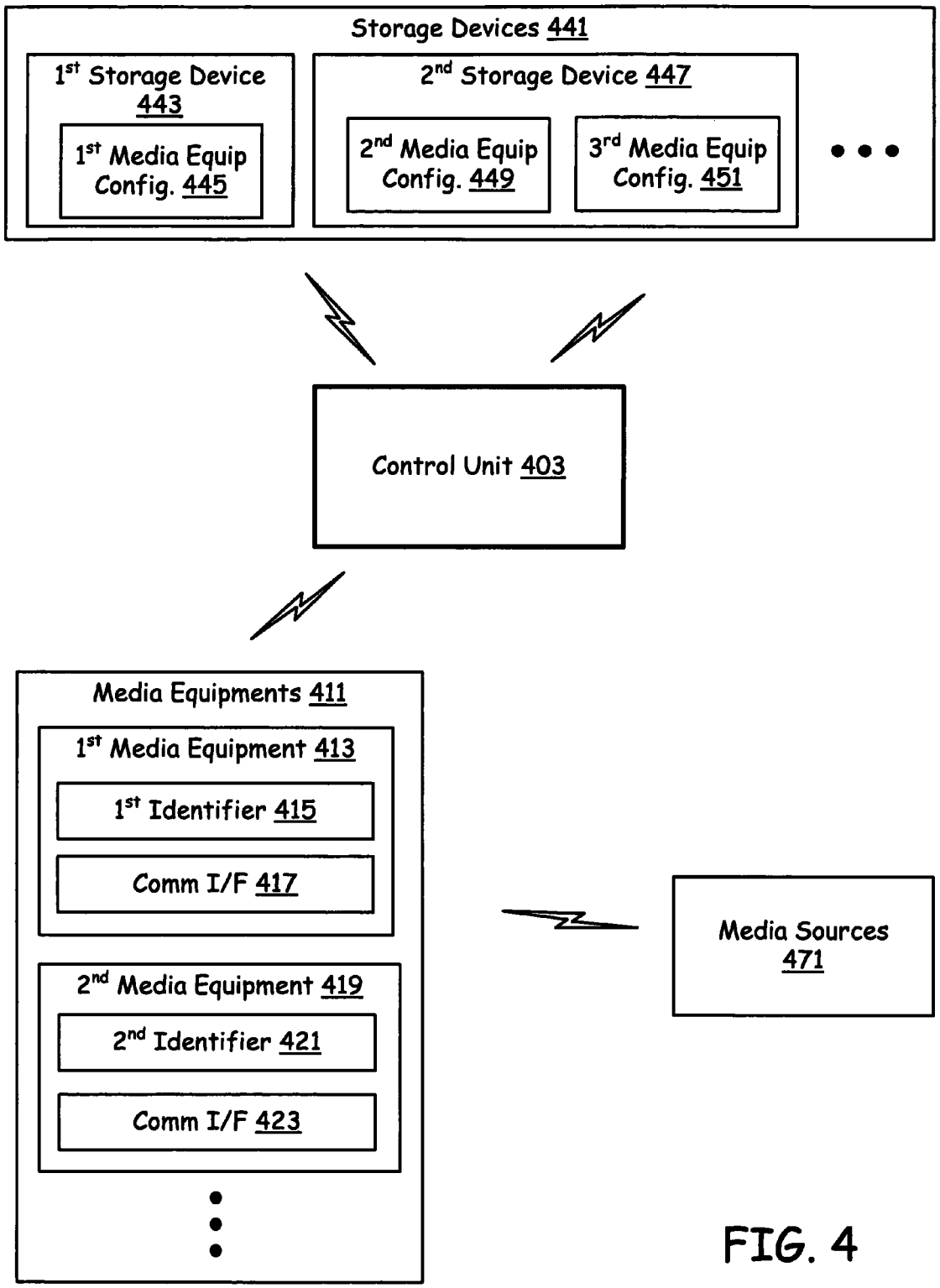
FIG. 4 is a schematic block diagram illustrating a control unit that accesses a plurality of configurations corresponding to a plurality of media equipments and configures itself to control the plurality of media equipments in accordance with various aspects of the present invention.

FIG. 4 is a schematic block diagram illustrating a control unit 403 that accesses a plurality of configurations corresponding to a plurality of media equipments 411 (or devices) and configures itself to control the plurality of media equipments 411 in accordance with various aspects of the present invention. The control unit 403, at a regular interval of time, searches for media equipments in its neighborhood. The control unit 403 tries to establish communication with the media equipments in its neighborhood. The control unit 403 may use, for example and without limitation, optical fiber, copper wire or wireless medium and communication techniques like infrared, Bluetooth, IEEE 802.11, IEEE 802.15, UltraWideBand, GSM, CDMA, any of a variety of cellular standards, satellite communication and any of a variety of communication standards/protocols to establish communication with the media equipments 411. The neighborhood comprises a geographical area that is accessible using the communication techniques the control unit 403 uses to establish the communication. The control unit 403 establishes communication links with a plurality of media equipments 411 that are situated in its neighborhood. The plurality of media equipments 411 comprises at least a first media equipment 413 (or device) and a second media equipment 419 (or device). The plurality of media equipments 411 may, for example and without limitation, comprise a television, an audio player, a PVR system, a DVD player, a home theater system, a video game system, etc. The plurality of media equipments 411 may be products from the same and/or different manufacturers. Each of the plurality of media equipments 411 comprises an identifier. The first media equipment 413 comprises a first identifier 415, and the second media equipment 419 comprises a second identifier 421. The identifier corresponding to one of the plurality of media equipments 411 may comprise identity of manufacturer, model number and registration number of the one of the media equipments 411. The plurality of media equipments 411 may not be of the same type. The plurality of media equipments 411 might not be from the same manufacturer.

The control unit 403 accesses the plurality of media equipments 411 using the established communication links to get identifiers corresponding to the plurality of media equipments 411. The control unit 403 receives the first identifier 415 from the first media equipment 413 and receives the second identifier 421 from the second media equipment 419 and so on. The control unit 403 tries to retrieve a first configuration 445 corresponding to the first media equipment 413 and a second configuration 449 corresponding to the second media equipment 419. In one configuration the control unit 403 is communicatively coupled to a plurality of storage devices 441. The control unit 403 searches for the first configuration 445 and the second configuration 449 in the plurality of storage devices 441 using the first identifier 415 and the second identifier 421. The plurality of storage devices 441 comprises at least a first storage device 443 and a second storage device 447. The control unit 403 retrieves the first configuration 445 from the first storage device 443 and the second configuration 449 from the second storage device 447.

In another embodiment the control unit 403 is not communicatively coupled to the plurality of storage devices 441. The first identifier 415 may comprise a first address of the first storage device 443 and the second identifier 421 may comprise a second address of the second storage device 447. The control unit 403 sets up a first communication link between the control unit 403 and the first storage device 443 using the first address and a second communication link between the control unit 403 and the second storage device 447 using the second address. Setting up of the first communication link and the second communication link does not include establishing a physical link between the control unit 403 and the first storage device 443 and between the control unit 403 and the second storage device 447, respectively. The setting up may comprise the control unit 403 and the first storage device 443 agreeing on a set of rules to be followed during interaction. The control unit 403 subsequently receives the first configuration 445 corresponding to the first media equipment 413 from the first storage device 443 via the first communication link and the second configuration 449 corresponding to the second media equipment 419 from the second storage device 447 via the second communication link. The control unit 403 stores the first configuration 445 and the second configuration 449 in its memory.

The control unit 403 receives a first input. The first input identifies, for example, the second media equipment 419. The control unit 403 configures itself using the second configuration 449 stored in the memory. The control unit 403 can be subsequently used to control settings and display of media elements in the second media equipment 419. Media elements may comprise, for example and without limitation, a movie, a television program, a stored video, a live snippet, a video game, an audio portion of the television program, a radio program, etc. The control unit 403 may subsequently receive a second input where the second input identifies the first media equipment 413. The control unit 403 configures itself using the first configuration 445 stored in the memory. The control unit 403 is now used to control settings and display of media elements in the first media equipment 413. In another embodiment, the control unit 403 receives a search request. The search request triggers the control unit 403 to search for the media equipments in its neighborhood.

Once the control unit 403 acquires a plurality of configurations (e.g., the first configuration 445, the second configuration 449, etc.) corresponding to the plurality of media equipments 411, the control unit 403 can be adapted to control all of the plurality of media equipments 411, one at a given time (or a plurality at a given time, in various alternative scenarios). If a new media equipment (or device) enters into the neighborhood, the control unit 403 tries to establish communication with the new media equipment. If the control unit 403 establishes a communication link with the new media equipment, then the control unit 403 receives a new identifier from the new media equipment. The control unit 403 next retrieves a new configuration corresponding to the new media equipment using the new identifier. The control unit 403 adapts itself to control the new media equipment using the new configuration on request.

Figure 5:
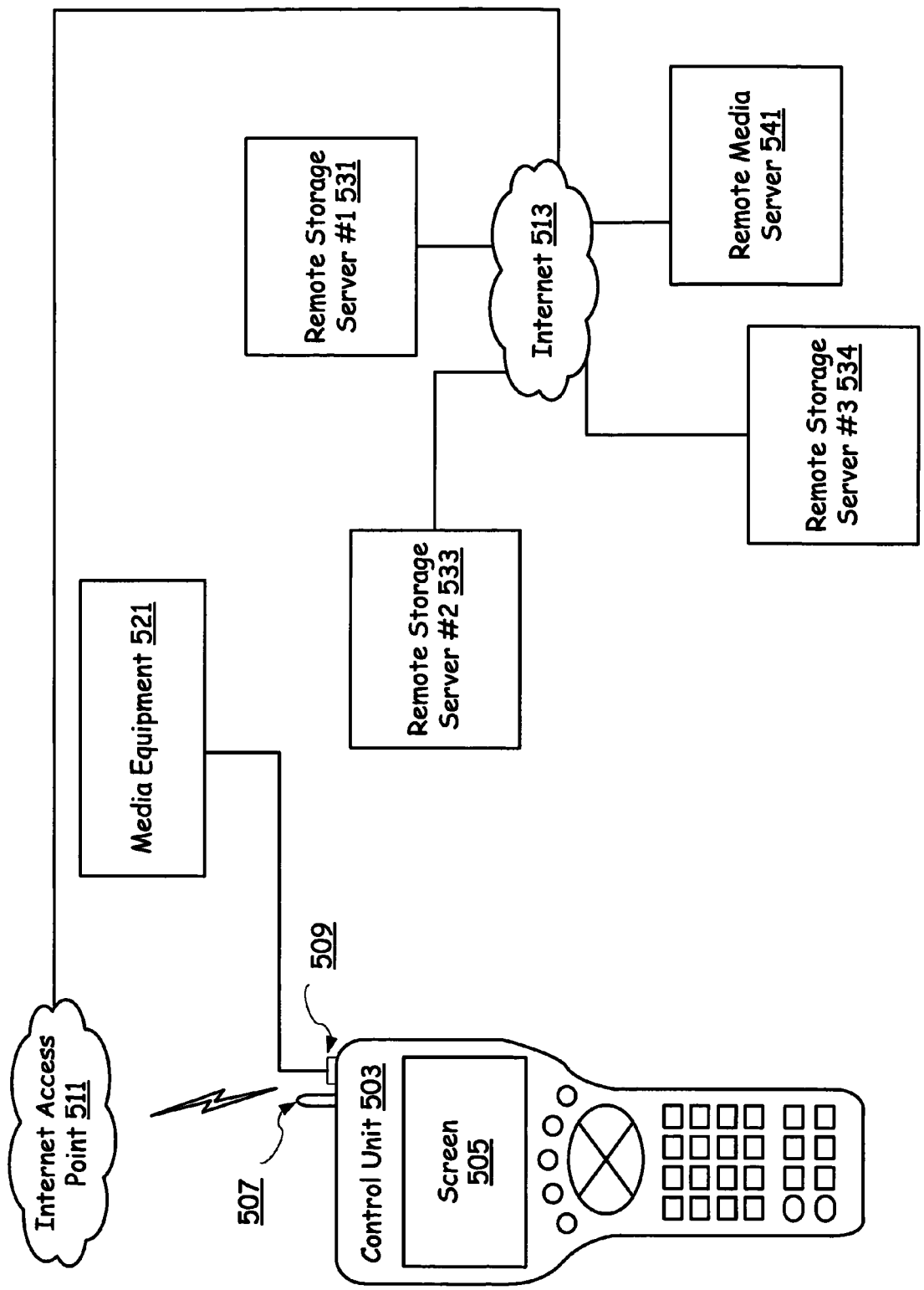
FIG. 5 is a schematic block diagram illustrating an embodiment of the control unit of FIG. 4 further supporting retrieval of the plurality of configurations from a plurality of remote storage servers that are accessible via Internet.

FIG. 5 is a schematic block diagram illustrating an embodiment of the control unit 403 of FIG. 4 further supporting retrieval of the plurality of configurations from a plurality of remote storage servers that are accessible via Internet 513. The control unit 503 comprises a screen 505, a first communication interface 507 and a second communication interface 509. The control unit 503 is communicatively coupled to Internet access point 511 via the first communication interface 507. The control unit 503 communicates with a media equipment 521 via the second communication interface 509. The control unit 503 communicates with the Internet access point 511 over a wireless link. The wireless link may comprise characteristics of IEEE 802.11, IEEE 802.15 and any standard or proprietary wireless protocol. The Internet access point 511 is connected to the Internet 513, for example, via one or a combination of an Ethernet link, a microwave link, a satellite link, a cellular phone link, a landline phone link and an optical fiber link. The control unit 503 is connected to the Internet 513 via the Internet access point 511 and the first communication interface 507. In some embodiments, the control unit 503 may be connected to the Internet access point 511 via a wired link that may be, for example, an optical fiber, an Ethernet link, a copper cable or a twisted pair.

The Internet 513 is communicatively coupled to a first storage server 531, a second storage server 533, a third storage server 534 and a remote media server 541. A plurality of configurations corresponding to a plurality of media equipments are stored in the first storage server 531, the second storage server 533 and the third storage server 534. The remote media server 541 stores a plurality of multimedia elements. The plurality of multimedia elements may be a combination of a movie, a video game, a stored video, a news portal and a radio program. The control unit 503, the media equipment 521, the first storage server 531, the second storage server 533, the third storage server 534 and the remote media server 541 are located at different premises.

The control unit 503 receives an identifier corresponding to the media equipment 521 to which it is communicatively coupled. In one embodiment, the control unit 503 receives the identifier from the media equipment 521 via the second communication interface 509. In another embodiment, the control unit 503 receives the identifier via one or more of a plurality of buttons of the control unit 503. The plurality of buttons are at least a portion of a user interface of the control unit 503. A user inputs a selection using the plurality of buttons. In some embodiments, the user interface may be one or more of a touchpad, a pen, a mouse and a thumbwheel. The control unit 503 searches for a configuration corresponding to the identifier (i.e., corresponding to the media equipment 521) in the first storage server 531, in the second storage server 533 and in the third storage server 534. The control unit 503 uses the identifier for searching. The control unit 503 uses the Internet access point 511 and the Internet 513 to access the first storage server 531, the second storage server 533 and the third storage server 534. The control unit 503 and three storage servers 531, 533 and 534 agree to communicate using any standard protocol such as IP (Internet protocol) or any proprietary protocol over the Internet 513. If the control unit 503 locates the configuration in any of three storage servers 531, 533 and 534, then the control unit 503 fetches the configuration.

In some embodiments, the identifier comprises an IP address of the second storage server 533. The identifier, in addition, comprises model number and make of the media equipment 521. The control unit 503 connects to the second storage server 533 using the IP address. The second storage server 533 may comprise the configuration of another media equipment of a different model number and of a different and/or same make. The control unit 503, using the identifier, retrieves the configuration corresponding to the media equipment 521 and downloads the configuration. In another embodiment, the second storage server 533 comprises the configuration corresponding to the media equipment 521 only.

In yet another embodiment, the identifier comprises the model number and the make of the media equipment 521. The control unit 503 has a lookup table stored in its memory. The lookup table includes names of manufacturers and corresponding IP addresses. From the lookup table the control unit 503 determines a second IP address where the configuration corresponding to the media equipment 521 is available. The control unit 503 communicates with a device identified by the second IP address and subsequently receives the configuration corresponding to the media equipment 521 from the identified device.

The configuration comprises a mapping between some or all of the plurality of buttons (user interface of the control unit 503) of the control unit 503 and a plurality of functionalities the media equipment 521 performs. The control unit 503 configures itself using the mapping information so that the media equipment 521 performs the plurality of functionalities when the some or all of the plurality of buttons are selected. The control unit 503 displays the mapping on the screen 505. The user, via visual interaction with the control unit 503, learns which of the plurality of buttons performs which of the plurality of functionalities on selection. The control unit 503 and the remote media server 541 agree to communicate using any standard protocol such as IP (Internet protocol) or any proprietary protocol over the Internet 513. The control unit 503 receives a media guide from the remote media server 541 via the Internet 513 and displays the media guide on the screen 505. The media guide identifies a plurality of multimedia elements supplied by the remote media server 541. The control unit 503 subsequently receives an input via the plurality of buttons (the user interface). The input identifies a first multimedia element and a second multimedia element from the plurality of multimedia elements. The Internet 513 may be communicatively coupled to media servers other than the remote media server 541. The control unit 503 receives the first multimedia element from the media server 541 using the agreed-upon protocol via the first communication interface 507 and the Internet access point 511. The control unit 503 forwards the first multimedia element to the media equipment 512 via the second communication interface 509. The media equipment 512 may, for example, be a television, a computer, a PVR system or a DVD player. The media equipment 512 plays the first multimedia element. The control unit 503 receives the second multimedia element from the media server 541 using the agreed-upon protocol via the first communication interface 507 and the Internet access point 511. The control unit 503 displays the second multimedia element on the screen 505.

Figure 6:
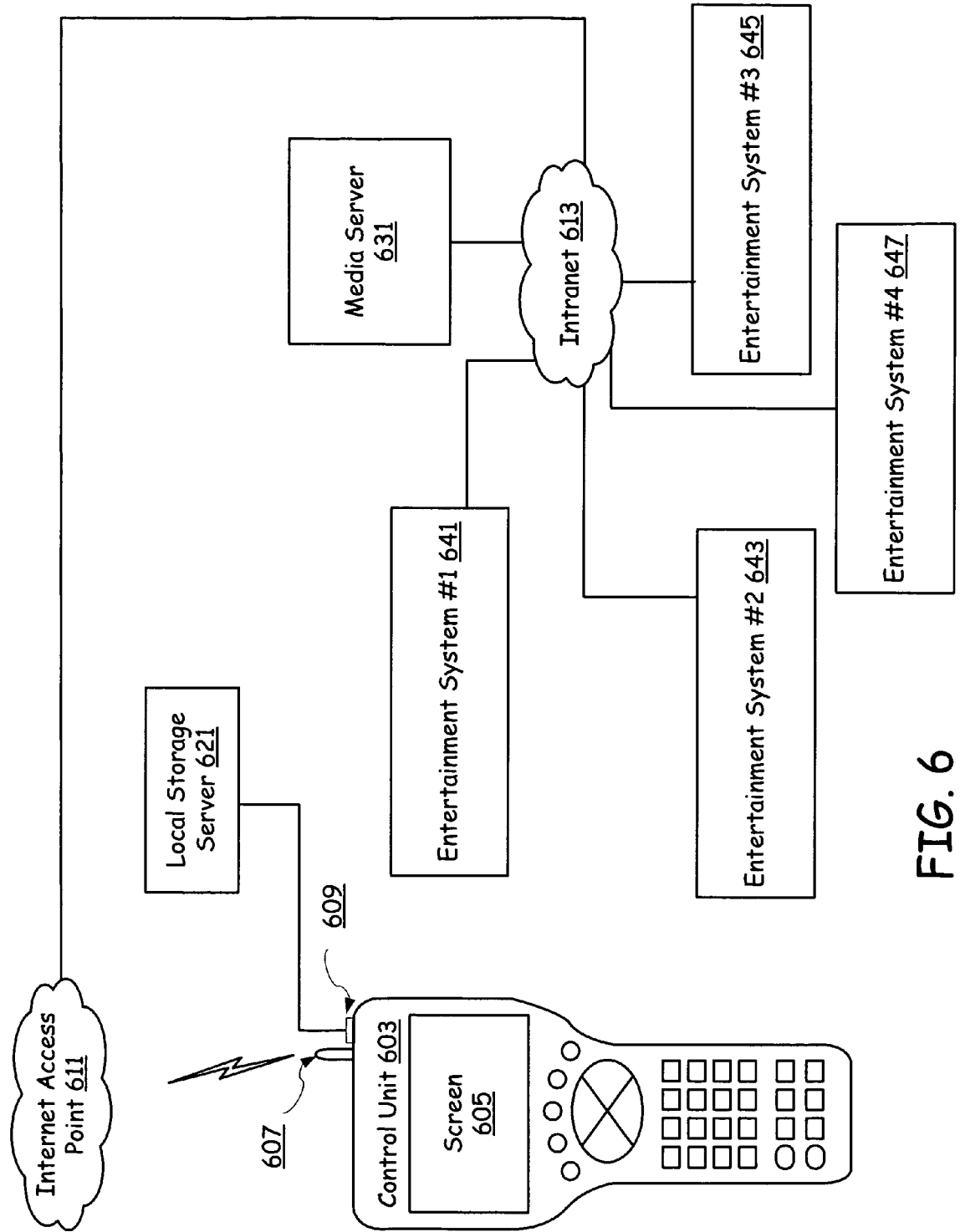
FIG. 6 is a schematic block diagram illustrating another embodiment of the control unit of FIG. 4, wherein the plurality of media equipments are part of a plurality of entertainment systems, and the control unit interacts with the plurality of entertainment systems and a remote media server via Internet.

FIG. 6 is a schematic block diagram illustrating another embodiment of the control unit 403 of FIG. 4 wherein the plurality of media equipments are part of a plurality of entertainment systems, and the control unit 603 interacts with the plurality of entertainment systems and a media server 631 via Intranet 613. The control unit 603 communicates to the Intranet 613 via a first communication interface 607 and Internet access point 611. A first entertainment system 641, a second entertainment system 643, a third entertainment system 645, a fourth entertainment system 647 and the media server 631 are communicatively coupled to the Intranet 613. The control unit 603 interacts with a storage server 621 via a second communication interface 609. The control unit 603 and the storage server 621 are located at a first premises. The media server 631 is located at a second premises. The control unit 603 comprises a screen 605. The control unit 603 is identified by an IP address. Using the IP address, the control unit 603 may access any device communicatively coupled to the Internet 613.

The control unit 603 is communicatively coupled to Global Positioning System (GPS). The control unit 603 gets triggered to search for media equipments whenever the control unit 603 changes its location. The control unit 603 may comprise a triggering unit that directs the control unit 603 to start the searching whenever the triggering unit senses a change in location. How much change in location triggers the control unit 603 to search for the media equipments is decided by a user and/or preset by the manufacturer of the control unit 603. The control unit 603 searches for the media equipments accessible via the Intranet 613. The control unit 603 determines that there are four entertainment systems, namely the first entertainment system 641, the second entertainment system 643, the third entertainment system 645 and the fourth entertainment system 647, accessible via the Intranet 613. The control unit 603 finds out if there are any interaction overlays corresponding to any of the four entertainment systems stored in the storage server 621. The control unit 603 determines that interaction overlays corresponding to the first entertainment system 641 and the second entertainment system 643 are stored in the storage server 621. The control unit 603 does not retrieve the interaction overlays stored in the storage server 621 again. The control unit 603 receives a first interaction overlay (keys, display, user interface, a first Internet address, etc.) for the third entertainment system 645 from the third entertainment system 645 and a second interaction overlay (keys, display, user interface, a second Internet address, etc.) for the fourth entertainment system 647 from the fourth entertainment system 647. In one embodiment the control unit 603 receives the first interaction overlay and the second interaction overlay from an Intranet server accessible via the Intranet 613.

The control unit 603 next communicates with the third entertainment system 645 using the first Internet address and communicates with the fourth entertainment system 647 using the second Internet address. The control unit 603 stores the first interaction overlay and the second interaction overlay in the storage server 621. The control unit 603 may in addition store the first interaction overlay and the second interaction overlay in its memory. The control unit 603 displays an entertainment system guide on the screen 605. The entertainment system guide comprises a list of entertainment systems the control unit 603 may control. The entertainment system guide reveals the identity of the four entertainment systems. In another embodiment, the control unit 603 displays the entertainment system guide on the screen 605 after receiving an entertainment system guide perusal request via its user interface. The entertainment systems may be, for example and without limitation, a media player like a DVD player, a VCD player, a radio, a television, a PVR system, a television set top box and a video game system. The user interface of the control unit 603 is typically a plurality of buttons.

The control unit 603, after displaying the entertainment system guide on the screen 605, receives a first selection via the user interface of the control unit 603. For example and without limitation, the first selection identifies the third entertainment system 645. Consequently the control unit 603 retrieves the first interaction overlay from the storage server 621 via the second communication interface 609. The control unit 603 configures itself using the first interaction overlay. The control unit 603 is now ready to be used for controlling settings and the playing of media elements on the third entertainment system 645. The user interface of the control unit 603 receives selections, and the control unit 603 sends control signals to the third entertainment system 645 directing the third entertainment system 645 to actuate utilities as per the selections. The utilities typically include a program/track selection, audio and video settings, media storage and playback, and entertainment system power control. The third entertainment system 645 is communicatively coupled to the media server 631. The control unit 603 may subsequently receive a second selection. The second selection identifies a first media element and the second media element available with the media server 631. The second selection, in addition, identifies a storage request for the second media element. The third entertainment system 645 is, for example, a television. The first media element is, for example, a first movie, and the second media element is, for example, a second movie. The first movie and the second movie are available with the media server 631. The control unit 603 sends a signal to the third entertainment system 645 directing the third entertainment system 645 to receive the first movie (the first media element) from the media server 631 and display a video portion of the first movie (the first media element) on a television screen and play an audio portion of the first movie on a television speaker. The control unit 603 receives the second movie (the second media element) from the media server 631 via the Intranet 613 and the first communication interface 607 and displays a video portion of the second movie (the second media element) on the screen 605. The control unit 603, in addition, forwards the second movie (the second media element) to the storage server 621 via the second communication interface 609. The storage server 621 stores the second movie.

The control unit 603 may subsequently receive a third selection. The third selection identifies a media-swapping request. The control unit 603 directs the third entertainment system 645 to receive the second movie (the second media element) from the media server 631 and display a video portion of the second movie (the second media element) on the television screen and play an audio portion of the second movie on the television speaker. The control unit 603 receives the first movie (the first media element) from the media server 631 via the Intranet 613 and displays a video portion of the first movie (the first media element) on the screen 605.

The control unit 603 receives a fourth selection. The fourth selection triggers the control unit 603 to configure itself using the second interaction overlay such that the control unit 603 now controls the fourth entertainment system 647. The user interface of the control unit 603 has a fixed number of buttons. To control settings of the fourth entertainment system 647, more buttons may be needed. The second interaction overlay comprises a mapping between a combination of two or more buttons of the control unit 603 and a corresponding functionality of the fourth entertainment system 647 so that all of functionalities of the fourth entertainment system 647 are actuated by selecting only one or a combination of buttons of the control unit 603. In some embodiments, to control settings of the fourth entertainment system 647, fewer buttons may be needed. The second interaction overlay in the some embodiments does not comprise any mapping from a few of the buttons of the control unit 603 so that the few of the buttons of the control unit 603 remain unused when the control unit 603 is used for controlling settings of the fourth entertainment system 647.

The control unit 603 changes its location and reaches a new location after an interval of time. The control unit 603 gets triggered to search for media equipments in the new location. The control unit 603 might not remain communicatively coupled to the Intranet 613 in the new location. The control unit 603 accesses a second Intranet and discovers a new set of entertainment systems communicatively coupled to the second Intranet.

Figure 7:
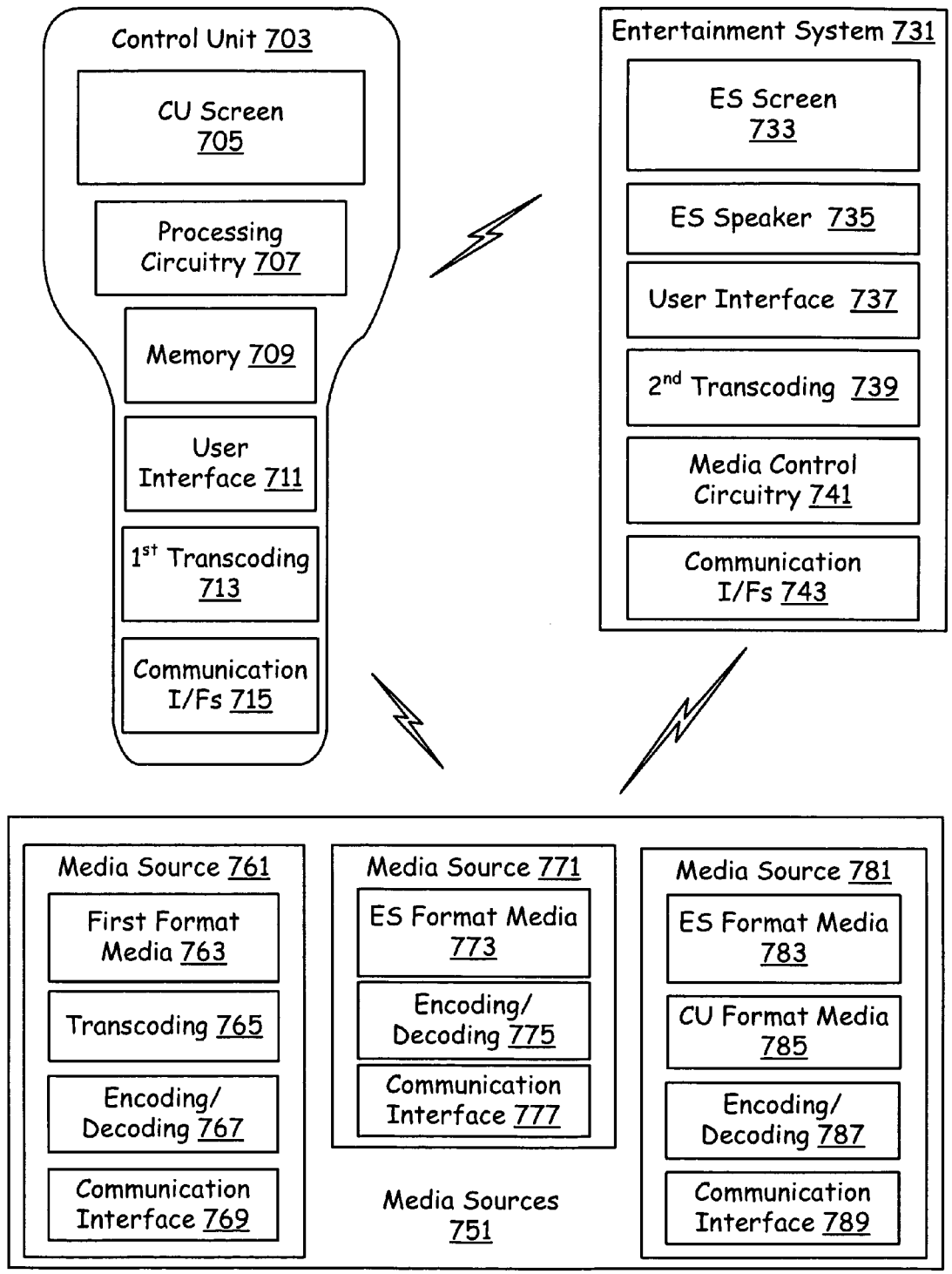
FIG. 7 is a schematic block diagram illustrating yet another embodiment of the control unit of FIG. 4 further supporting interaction with a plurality of media sources and transcoding functionality in the control unit.

FIG. 7 is a schematic block diagram illustrating yet another embodiment of the control unit 403 of FIG. 4 further supporting interaction with a plurality of media sources and transcoding functionality in the control unit. The control unit 703 comprises a CU (control unit) screen 705, processing circuitry 707, a memory 709, a user interface 711, a first transcoding unit 713 and communication interfaces 715. An entertainment system 731 comprises an ES (entertainment system) screen 733, an ES speaker 735, a user interface 737, a second transcoding unit 739, media control circuitry 741 and communication interfaces 743. The entertainment system 731 interacts with media sources 751. The media sources 751 comprise a first media source 761, a second media source 771 and a third media source 781. The entertainment system 731 interacts with the first media source 761, the second media source 771 and the third media source 781 via the communication interfaces 743. The control unit 703 acquires interaction information corresponding to the entertainment system 731. The interaction information may comprise an address of the entertainment system 731, information regarding the user interface 737 of the entertainment system 731 and information regarding the ES screen 733. The processing circuitry 707 of the control unit 703 configures the user interface 711 of the control unit 703 using the interaction information such that the user interface 711 of the control unit 703 controls and actuates functionalities identical to functionalities controlled and actuated by the user interface 737 of the entertainment system 731. The control unit 703 is located at a first premises, and the entertainment system 731 is located at a second premises. The control unit 703 is used to control settings and display of media elements on the entertainment system 731 remotely. The media elements are typically a movie, a television program, a news feed, a video game, web content, a live snippet and a stored video.

Once the control unit 703 is ready to be used as a remote control for the entertainment system 731, the control unit 703 communicates with the entertainment system 731 using the address of the entertainment system 731 through the communication interfaces 715. The control unit 703 communicates with the entertainment system 731 typically via one or a combination of an optical fiber, a copper cable, an IEEE 802.11 link, an IEEE 802.15 link, a cellular network, a phone network, an infrared link, a satellite link, etc. The control unit 703 looks for availability of communication links between the control unit 703 and the first media source 761, the second media source 771 and the third media source 781. The control unit 703, for example and without limitation, finds a first communication link between the control unit 703 and the first media source 761 and a second communication link between the control unit 703 and the third media source 781. The first communication link and/or the second communication link may be a direct link between the control unit 703 and corresponding media source or an indirect link that goes via some other devices such as a set top box or a media server. The control unit 703 communicates with the first media source 761 over the first link and communicates with the third media source 781 over the second link.

The control unit 703 receives a media guide perusal selection via the user interface 711. The control unit 703 receives a first media guide from the first media source 761. The control unit 703 displays the first media guide on the CU screen 705. The control unit 703, in addition, receives a second media guide from the third media source 781 and displays the second media guide on the CU screen 705. The first media guide and the second media guide identify a first plurality of media elements available with the first media source 761 and a second plurality of media elements available with the third media source 781, respectively. The control unit 703 may subsequently receive a media selection via the user interface 711 from a user who interacts with the control unit 703 visually. The media selection, for example and without limitation, identifies a first media element from among the first plurality of media elements for the entertainment system 731 and a second media element from among the second plurality of media elements for the control unit 703. The control unit 703 sends a signal to the entertainment system 731 directing it to receive the first media element from the first media source 761. The entertainment system 731 consequently receives the first media element from the first media source 761 via the communication interfaces 743. The entertainment system 731 plays an audio portion of the first media element in the ES speaker 735 and displays a video portion of the first media element on the ES screen 733.

The control unit 703 receives the second media element from the third media source 781 via the communication interfaces 715. A video portion of the second media element is, for example and without limitation, in HDTV (High Definition Television) format while the CU screen 705 supports QVGA (Quarter Video Graphics Array) format. The communication interface 715 of the control unit 703 forwards the second media element to the first transcoding unit 713. The first transcoding unit 713 converts the video portion of the second media element from HDTV format to QVGA format and forwards the formatted video portion of the second media element to the CU screen 705 for display. For example, the video portion of the first media element is in VGA (Video Graphics Array) format while the ES screen 733 supports HDTV format. The first media source 761 comprises a transcoding unit 765. The transcoding unit 765 of the first media source 761 converts the video portion of the first media element from VGA format to HDTV format before sending the first media element to the entertainment system 731. The entertainment system 731 receives the first media element with the video portion in HDTV format, a format that is supported by the ES screen 733. In one embodiment, the entertainment system 731 receives the video portion of the first media element in VGA format and passes the first media element through the second transcoding unit 739. The second transcoding unit 739 converts the video portion of the first media element from VGA format to HDTV format and forwards the video portion to the ES screen 733 for display.

In some embodiments, the entertainment system 731 is not communicatively coupled to the first media source 761, the second media source 771 and the third media source 781 a priori. The control unit 703, after adapting itself to control the entertainment system 731, looks for availability of communication links between the entertainment system 731 and the first media source 761, the second media source 771 and the third media source 781. The control unit 703, for example and without limitation, finds a third communication link between the entertainment system 731 and the first media source 761 and a fourth communication link between the entertainment system 731 and the second media source 771. The control unit 703 receives a selection via the user interface 711. The selection identifies a third media element stored in the first media source 761. The selection, in addition, identifies the entertainment system 731. The control unit 703 triggers the entertainment system 731 to receive the third media element from the first media source 761 via the third communication link. In another embodiment, the entertainment system 731 receives the third media element from the first media source 761 via the control unit 703 on unavailability of a direct communication path between the entertainment system 731 and the first media source 761.

Figure 8:
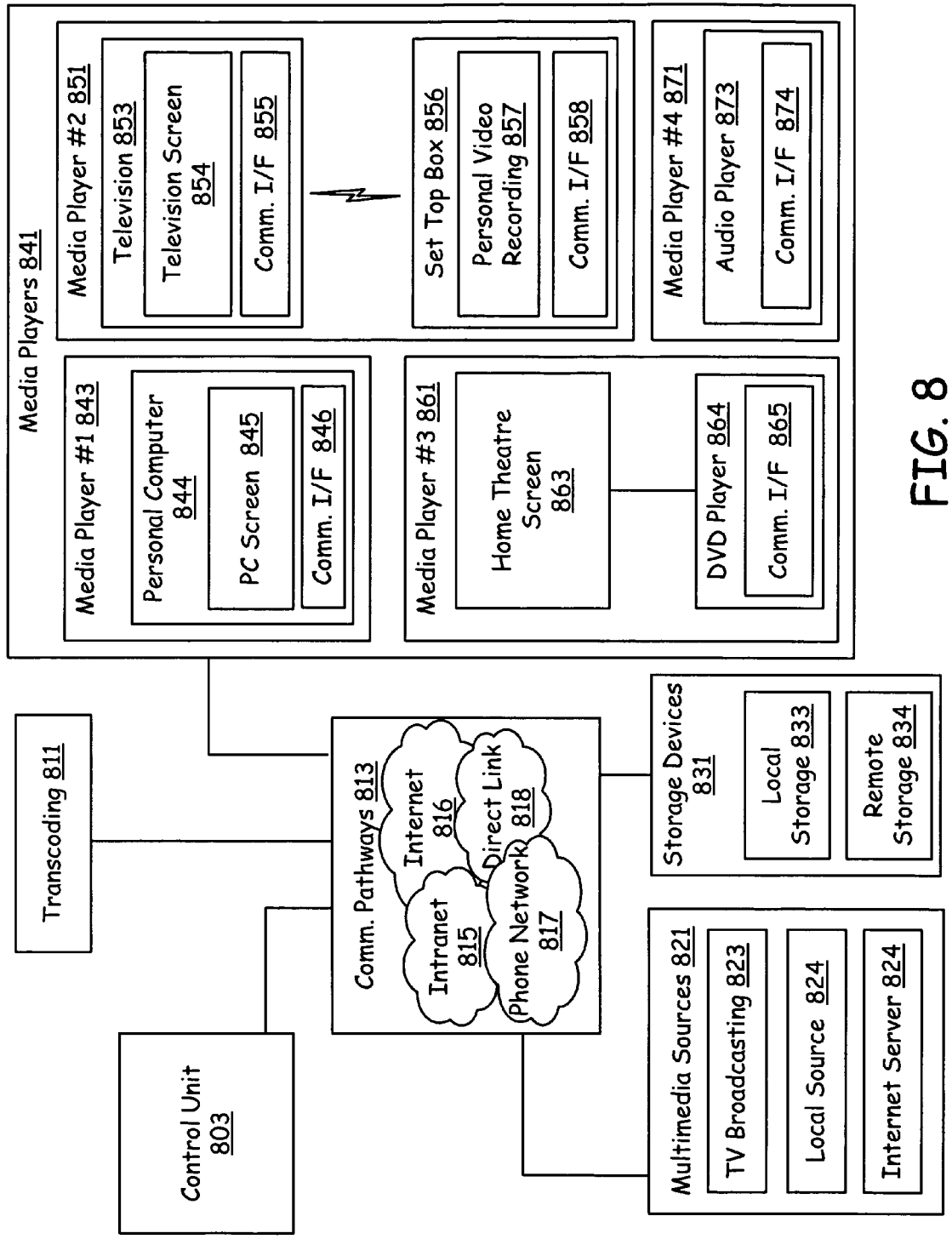
FIG. 8 is a schematic block diagram illustrating interaction between a control unit, a plurality of media players, a transcoding unit, a plurality of multimedia sources and commication pathways in accordance with various aspects of the present invention.

FIG. 8 is a schematic block diagram illustrating interaction between a control unit 803, a plurality of media players 841, a transcoding unit 811, a plurality of multimedia sources 821 and communication pathways 813. The control unit 803 comprises a user interface. The user interface may be one or a combination of a plurality of buttons, a touchpad, a thumbwheel, a voice based interface, a pen based interface, a mouse, etc. The control unit 803 adapts to support media players in its neighborhood. Protocols, standards and/or communication media the control unit 803 uses to interact with the media players 841 may determine the neighborhood. For example, when the control unit 803 is placed in a bedroom, the control unit 803 adapts to support media players in the bedroom. Location of the control unit 803 is monitored by a GPS system. When the control unit 803 changes its location, the control unit 803 is directed by the GPS system to search for media players in its neighborhood. The control unit 803 subsequently discovers the media players in its neighborhood and determines communication pathways 813 between the discovered media players and the control unit. The communication pathways 813 may comprise characteristics of an Intranet link 815, an Internet link 816 and a phone link 817. For example and without limitation, the control unit 803 is in the bedroom, and the control unit 803 discovers the following media players, a personal computer 844, a television 853 and a DVD player 864. The control unit 803 subsequently communicates with the discovered media players (the personal computer 844, the television 853 and the DVD player 864) using the communication pathway 813 and receives identifiers from the discovered media players. The identifiers may comprise registration numbers, model numbers, name and/or codes corresponding to manufacturers of the discovered media players and addresses where user interface information corresponding to the discovered media players is available.

In some embodiments the control unit 803 periodically searches for media players in its neighborhood. A time interval between two consecutive searches may be set using the user interface of the control unit 803. The control unit 803 stores the identifiers corresponding to the discovered media players in a local storage system 833. The control unit 803 and the local storage system 833 are located at the same premises. The control unit 803 may comprise the local storage system 833. After a time span, the control unit 803 performs a second search for media players. There may be few media players common to the two consecutive searches. In yet other embodiments, the control unit 803 is triggered manually to search for media players in its neighborhood. For example and without limitation, an audio player 873 is kept inside the bedroom after the control unit 803 has discovered the personal computer 844, the television 853 and the DVD player 864. The GPS system does not trigger the control unit 803 to search for audio player 873, as location of the control unit 803 has not changed. A manual triggering of the control unit 803 helps the control unit 803 to discover the audio player 873 in the bedroom.

Once the control unit 803 receives the identifiers corresponding to the discovered media elements (the personal computer 844, the television 853, the DVD player 864 and the audio player 873), the control unit 803 retrieves the user interface information corresponding to the discovered media elements from the addresses identified by the identifiers. The control unit 803 configures itself using the user interface information. For example, the control unit 803 retrieves first user interface information corresponding to the personal computer 844, second user interface information corresponding to the television 853, third user interface information corresponding to the DVD player 864 and fourth user interface information corresponding to the audio player 873. The control unit 803 stores the first user interface information, the second user interface information, the third user interface information and the fourth user interface information in the local storage system 833.

The first, the second, the third and/or the fourth user interface information may comprise a visual representation of button (user interface) response functionality. Such user interface information helps if the control unit 803 comprises a screen and the user interface of the control unit 803 comprises a plurality of buttons. The control unit 803 configures itself using the user interface information. The control unit 803 displays the visual representation of button response functionality on the screen of the control unit 803, and a user controls functionalities and/or settings of the personal computer 844, the television 853, the DVD player 864 and/or the audio player 873 by visually interacting with the screen of the control unit 803.

In few embodiments, the control unit 803 does not comprise a screen, and the user interface of the control unit 803 comprises the plurality of buttons. The plurality of buttons typically comprise for example and without limitation, an 'up' button, a 'down' button, an 'increase volume' button, etc. The control unit 803 configures itself using the first user interface information. The control unit 803 is now ready to control settings of the personal computer 844. If the 'up' button is selected, the control unit 803 directs the personal computer 844 to open and display a next media file on a PC screen 845. Suppose the control unit 803 configures itself using the second user interface information. The control unit 803 is now ready to control settings of the television 853. If the 'up' button is selected, the control unit 803 directs the television 853 to receive a next channel from a television broadcaster and display the next channel on a screen 854 of the television 853.

The user interface information may comprise an image that displays a plurality of icons where each of the plurality of icons corresponds to a different functionality. Such user interface information helps if the control unit 803 comprises a touch screen. The control unit displays the image on the touch screen. The user enters a selection by touching the touch screen at an icon location. The control unit 803 instructs the personal computer 844, the television 853, the DVD player 864 and/or the audio player 873 to perform a functionality corresponding to the selected icon.

The control unit 803 retrieves the first user interface information, the second user interface information, the third user interface information and the fourth user interface information from corresponding media players after a first search. The control unit 803 may retrieve more than four sets of user interface information from a storage server 834. The control unit 803 is located at a first premises, and the storage server 834 is located at a second premises. If, during a second search, the control unit 803 comes across a media player already discovered in the first search, then the control unit 803 does not retrieve user interface information corresponding to the media player after the second search.

For example and without limitation, the control unit 803 configures itself using the second user interface information corresponding to the television 853. The control unit 803 next receives a media storage selection via the user interface of the control unit 803. The media storage selection identifies a program (media element) broadcast by a television broadcaster and a PVR (Personal Video Recorder) 857. The control unit 803 sends control signal to the television 853 directing the television 853 to receive the program (media element) from the television broadcaster and store the program in the PVR 857. The control unit 803 also receives the program from the television broadcaster and displays a video portion of the program on the screen of the control unit 803. The media storage selection may be preceded by a plurality of media selections wherein each of the plurality of media selections identifies a different program broadcast by the television broadcaster. The control unit 803 receives and displays a video portion of each of the different programs on the screen of the control unit 803.

The control unit 803 receives the user interface information. The control unit 803 may adapt itself to control the personal computer 844, the television 853, the DVD player 864 and the audio player 873, one at a time. The control unit 803, via the communication pathway 813, interacts with all of multimedia sources 821. In yet another embodiment the control unit 803 stores a media guide in the local storage system 833. The media guide identifies a plurality of media elements available with the multimedia sources 821. When the control unit 803 changes location, the control unit 803 might not remain communicatively coupled to the all of the multimedia sources 821. The control unit 803 might remain communicatively coupled to some of the multimedia sources 821 due to a change in location. Content of the media guide consequently changes.

Figure 9:
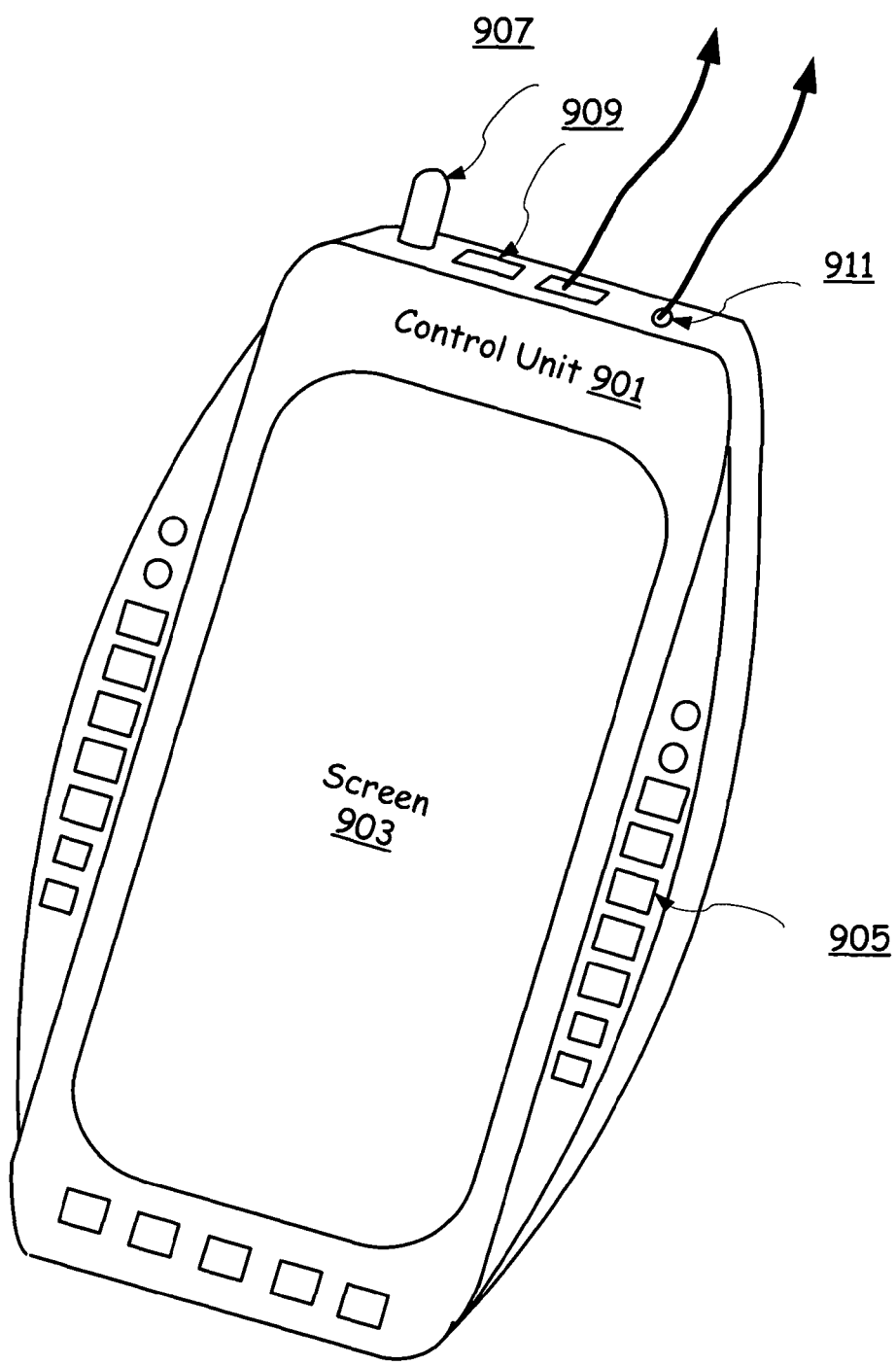
FIG. 9 is a schematic block diagram illustrating an embodiment of the control unit of FIG. 8 wherein the control unit comprises a screen that is touch sensitive, the screen displaying user interface information corresponding to the plurality of media players one at a time.

FIG. 9 is a schematic block diagram illustrating an embodiment of the control unit 803 of FIG. 8 wherein the control unit 901 comprises a screen 903 that is touch sensitive, the screen 903 displaying user interface information corresponding to the plurality of media players 841 one at a time. The control unit 901 receives a plurality of identifiers corresponding to the plurality of media players 841 from the plurality of media players 841. The control unit 901 receives a plurality of user interface information corresponding to the plurality of media players 841 using the plurality of identifiers. The control unit 901 stores the plurality of user interface information. The control unit 901 comprises a plurality of buttons 905. The plurality of buttons 905 and the touch sensitive screen 903 are the user interface of the control unit 903.

A first user interface information (or unit of user interface information) corresponds to one of the plurality of media players 841. The first user interface information comprises an image of a plurality of icons where each of the plurality of icons corresponds to a different functionality from a first plurality of functionalities performed by the one of the plurality of media players 841. The plurality of icons thus refer to the first plurality of functionalities. The image, in addition, comprises a mapping between the plurality of buttons 905 and a second plurality of functionalities performed by the one of the plurality of media players 841. The plurality of buttons 905 thus refer to the second plurality of functionalities. The control unit 901 displays the image on the screen 903. A user, via visual interaction, sees a correspondence between the user interface of the control unit 901 and the first and the second plurality of functionalities. The user may, for example, select a functionality (or function) by touching the screen 903 at a location where an icon corresponding to the functionality is displayed. The control unit 901 responds to the selection by generating and sending a control signal that directs the one of the plurality of media players 841 to execute the functionality.

For example and the without limitation, the first user interface information corresponds to an audio player (media player). The control unit 901 displays the user interface information of the audio player on the screen 903. The user interface information comprises an icon showing a 'speaker'. The user selects the 'speaker' icon by touching the screen 903 at a location where the 'speaker' icon is displayed on the screen 903. The user next selects a button corresponding to an 'increase' functionality from the plurality of buttons 905. The control unit 901 sends a control signal to the audio player directing the audio player to increase volume of the speaker of the audio player. Consequently the audio player increases the volume of the speaker.

As one of average skill in the art will appreciate, the term "communicatively coupled," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

We claim:

1. A control unit that is portable, the control unit comprising:

a user interface;

a communication interface that is operable to communicatively couple to at least one of a plurality of servers through the Internet; and processing circuitry that is operable to, at least:

determine an amount of change in geographic location of the control unit;

determine to configure the control unit based, at least in part, on a comparison between the determined amount of change in geographic location and a threshold amount of change in geographic location;

and in response to determining to configure the control unit:

retrieve, from the at least one of the plurality of servers via the communication interface, a configuration corresponding to an identifier that identifies a media equipment to be controlled by the control unit; and configure the control unit, using the retrieved configuration, to control the media equipment;

wherein the user interface of the configured control unit is operable to control the media equipment.

2. The control unit of claim 1, wherein the communication interface is operable to, prior to retrieving the configuration from the at least one of the plurality of servers, receive the identifier from the media equipment.

3. The control unit of claim 1, wherein the user interface is operable to receive an input that comprises the identifier.

4. The control unit of claim 1, wherein the processing circuitry is operable to utilize the user interface to present a plurality of identifiers to a user of the control unit, and the user interface is operable to receive the identifier via user selection of one of the presented plurality of identifiers.

5. A control unit comprising:

a user interface;

a communication interface; and processing circuitry that is operable to, at least:

retrieve a plurality of identifiers via the communication interface by, at least in part, searching for media equipment coupled to a local area network, the plurality of identifiers corresponding to a plurality of respective different media equipments;

retrieve a plurality of respective configurations corresponding to the plurality of identifiers; and store the plurality of respective configurations in a memory, at least one of the plurality of configurations to be used to control corresponding media equipment from the plurality of different media equipments, wherein the processing circuitry is operable to search for media equipment situated in proximity to the control unit at regular intervals of time;

wherein the regular intervals of time are user-defined.

6. The control unit of claim 1, wherein the processing circuitry is operable to configure the control unit by, at least in part, using the retrieved configuration to map functionalities of the media equipment to the user interface of the control unit.

7. The control unit of claim 1, wherein the media equipment comprises media playing equipment.

8. The control unit of claim 1, wherein the media equipment comprises a set top box.

9. The control unit of claim 1, wherein the media equipment comprises a television.

10. The control unit of claim 1, wherein: the user interface is operable to receive an input from a user of the control unit indicating the threshold amount of change in location that will trigger configuration of the control unit.

11. The control unit of claim 1, wherein the processing circuitry comprises Global Positioning System (GPS) circuitry that operates to determine the location of the control unit.

12. The control unit of claim 1, wherein the processing circuitry is operable to, in response to determining to configure the control unit, search for media equipment in a geographical area.

13. The control unit of claim 1, wherein the processing circuitry is operable to control a plurality of different media equipment at a plurality of different respective premises.

14. The control unit of claim 1, wherein the processing circuitry is operable to retrieve the configuration by, at least in part, operating to attempt to retrieve the configuration from a plurality of different servers of a communication network.

15. The control unit of claim 1, comprising a look-up table cross-listing manufacturers and respective communication network addresses.

16. The control unit of claim 1, wherein the processing circuitry is operable to interface with a remote media source through a communication network to determine a communication protocol to be used for communication between the control unit and the remote media source.

17. The control unit of claim 2, wherein the identifier received from the media equipment comprises a communication network address of a server from which the configuration is to be retrieved.

* * * * *